E. D. TILLYER
Nov. 25, 1930. OPHTHALMIC LENS Re. 17,887
Original Filed Feb. 23, 1922 2 Sheets-Sheet 1
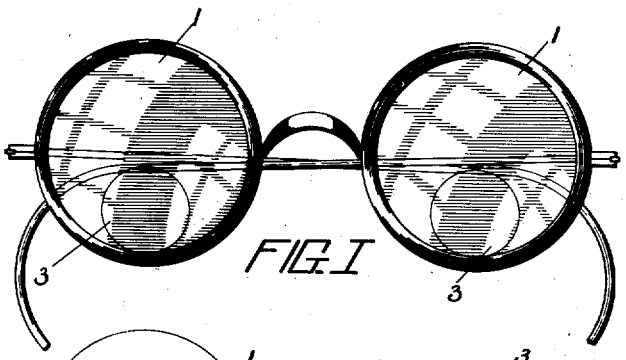
FIG. I
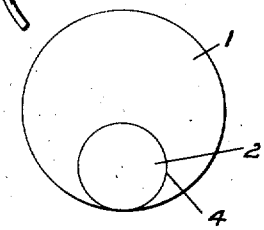
FIG. II
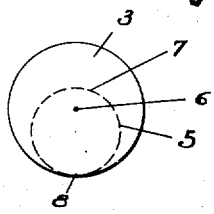
FIG. III
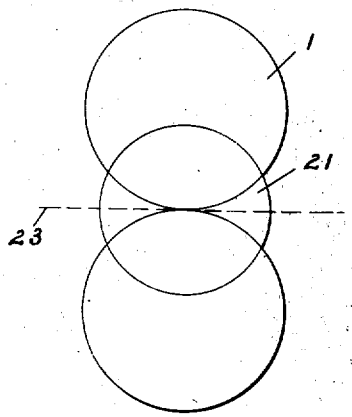
FIG. IV
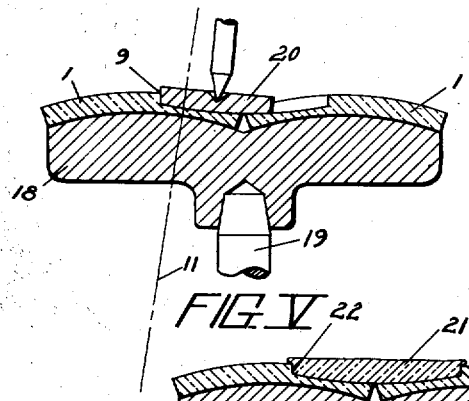
FIG. V
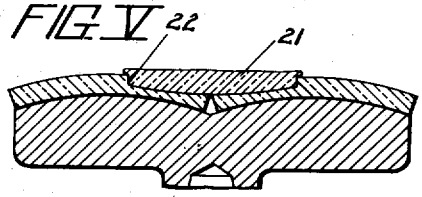
FIG. VI
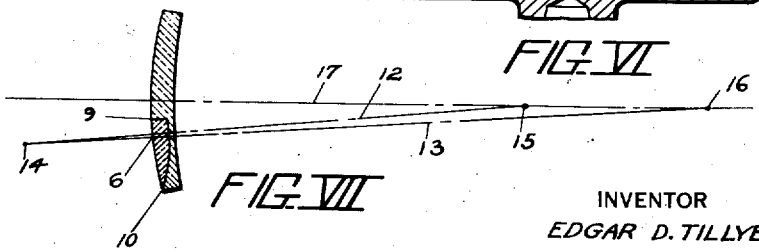
FIG. VII
INVENTOR
EDGAR D. TILLYER
BY
H. H. Styll & H. H. Parsons
ATTORNEYS E. D. TILLYER
Nov. 25, 1930. OPHTHALMIC LENS Re. 17,887
Original Filed Feb. 23, 1922 2 Sheets-Sheet 2
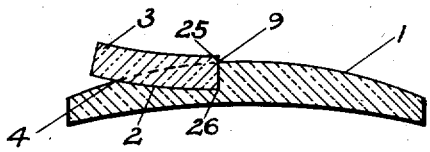
FIG. VIII
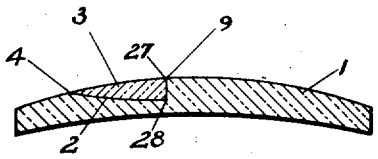
FIG. IX
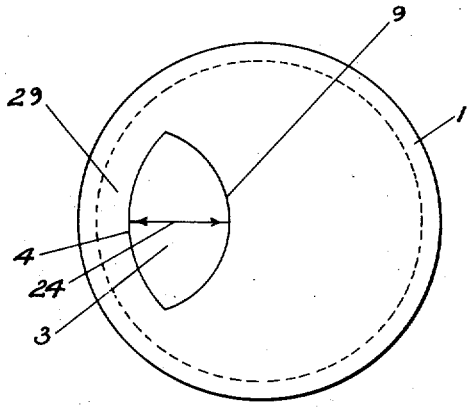
FIG. X
INVENTOR
EDGAR D. TILLYER
BY
H. H. Styll & H. H. Parsons
ATTORNEYS Reissued Nov. 25, 1930

Re. 17,887

UNITED STATES PATENT OFFICE

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC LENS

Original No. 1,544,612, dated July 7, 1925, Serial No. 538,563, filed February 23, 1922. Application for reissue filed August 21, 1930. Serial No. 476,895.

This invention relates to improvements in ophthalmic lenses and has particular reference to a novel and improved construction of bifocal or multifocal lens.

One of the principal objects of the present invention is the provision of a novel and improved form of two part bifocal or multifocal lens in which the circle of the sphere or reading vision portion shall be so disposed as to best facilitate the use of the portion and to at the same time eliminate to a very great degree the jump or displacement of the image as the eye passes over the line of division between the two portions of the lens.

A further object of the present invention is the provision of a novel and improved manner or process of constructing the lens in question.

A further object of the present invention is the provision of a lens which shall of itself be novel and produced by a novel process by which the relative position of the centers of the near and distance portion are varied as desired without affecting the general appearance of the lens considered physically as distinguished from optically, and without the necessity of a multiplicity of fusing operations tending to introduce weaknesses in the lens.

Other objects and advantages of the improved lens and method of producing the same should be readily apparent by reference to the following specification taken in connection with the accompanying drawings, and it will be understood that any modifications in the specific details of construction shown and described may be made within the scope of the appended claims without departing from or exceeding the spirit of my invention.

Figure I is a front view of a pair of glasses embodying the improvement.

Figure II is a front view of the major blank from which the lens is formed.

Figure III is a similar view of the minor disc or segment.

Figure IV is a plan view of a pair of simultaneously constructed lenses.

Figure V is a sectional view of said parts illustrating the method of construction.

Figure VI is a similar view of the segment construction, and

Figure VII is a semi-diagrammatic sectional view through the completed lens illustrating the relationship of the several optical axes and the several effects produced.

Figure VIII is a cross sectional view of a slightly modified form of blank.

Figure IX is a similar view showing the bifocal side finished.

Figure X is a plan view of the structure shown in Figure IX.

Prior to this invention it has been customary in the construction of two part bifocals, as for example, in what is commonly called the Kryptok lens, to make use of a major portion of one refractive index and a minor portion of a different refractive index, a countersink for the minor portion being formed in the major portion and having its thinnest point or the point through which the optical axis of the countersink passes disposed at the geometrical center of the countersink. Bifocals of this type when completed have had the center of the reading portion therefore disposed way down into the reading portion. It is one of the purposes of the invention to obviate the difficulties present when the center is so positioned by providing a construction in which the center is near but preferably not on the line of division between the two fields and is concentrically disposed with respect to the curved line of division between said fields.

In the drawings there is disclosed a major portion 1 provided with the countersink 2 adapted to receive the segment 3 which I suitably secure in place either by cement, fusion or the like. In the form shown in Figures I and II it is to be noted that the segment or reading portion is substantially circular in form. Prior to the invention, however, it has been customary to have this reading portion tapering to a feather edge around the line of joinder 4 between these fields. As distinguished from this, in this invention, however, the segment 3 is formed, as is shown in Figure III, of a diameter substantially greater than the countersink 2 and is then cut out as on the dotted line 5. This cutting, it will be noticed, is eccentric with respect to the normal circular outline of the segment 3, the optical center of the convex or countersink engaging curve of the segment being disposed as at 6, and the dotted line 5 relatively closely approaching this point 6 in the separation. The result is that the segment thus formed will have a relatively thick edge as at the point 7 and taper to a substantially feather edge at the diametrically opposite point 8. At the same time the countersink 2 is formed in tilted relation to the major blank 1, having a thick ridge as at 9 and merging outward into the surface of the blank as at the point 10. The result of this manner of construction is that as is indicated in Figure V, optical axis of the ground out countersink will lie on the line 11 or near the edge or shoulder 9 while the segment mounted in the countersink will form a prismatic member as is most clearly illustrated in connection with Figure VII, the optical axis of said member separately considered being as along the line 12 connecting the centers of the two sides of the segment. On account of the difference in index of refraction of the two glasses, however, the optical axis of the countersink and the optical axis of the included segment will both be different from each other and from the optical axis of the major portion of the lens. The optical axis of the inserted segment is determined by the line 12 connecting the center 14 of curvature of the countersink and rear face of the segment 6 with the center 15 of curvature of the front face of the lens, while the optical axis of the countersink is determined by the line 13 connecting the center 14 with the center 16 which is the center of curvature of the rear surface. It will be noted by reference to Figure VII that these two optical axes are verv nearly co-incident and in fact so nearly correspond that it is difficult to distinguish one from the other in their course through the segment or reading portion of the lens so that the optical center of the reading portion is found to be located at the point 6 which may be considered as having a right area bounded by the lines 12 and 13 and in upper and lower lenses said center being, it will be noticed, near the upper edge of the countersink but preferably rightly spaced therefrom as well as from the optical axis 17 or the distance portion of the lens determined by the centers 15 and 16 and as illustrated in connection with Figure VII.

In Figures IV, V and VI, there is disclosed another method of constructing the lens in which the results attained and the optical principles involved are identical with those previously described. In Figure V it will be noted that in this form in place of forming the countersink as an individual proposition, the blanks 1 are simultaneously secured on the block 18 at the proper angle with respect to each other and to the revolving spindle 19 which serves to rotate the block 18 and blanks carried thereby, the center of curvature of the countersinks therefore lying in the axis of the spindle 19 extended, and when abraded by the grinding tool or lap 20, the two necessary depressions or countersinks are formed. The optical axes are determined by the combination of the countersink curve and the curve of the blank passing through the lenses near the cliff 9 as is clearly shown in connection with Figure V. The blank having been thus ground may either be retained in the same position as when ground as is indicated in Figure VI, while a single large central button or bifocal segment portion 21 is fused in place or may be removed from the blank and have individual buttons applied thereto. The advantage, however, of retaining the parts together is that a single button 21 may be employed with best satisfaction in that relation, the heat of fusion employed being sufficient to satisfactorily soften the button so that its edge as at 22 will most firmly and properly fuse or unite with the cliff 9 at the edge of the countersink so as to render the joint between the parts entirely invisible. After the parts have been fused together in this paired relation they may then be satisfactorily separated as along the dotted line 22 indicated in Figure IV, giving two individual blanks each having a reading portion with its optical center near the upper edge thereof, the lens being formed from two pieces of glass united by fusion and ground to have a smooth and continuous curve on the bifocal face thereof. It will, of course, be noticed by reference to the drawings that the fusion of a large central button greatly increases the thickness at the lower edge of the combined blank and it is to be understood that the final grinding of the front curve surface is substantially as shown in Figure VII cutting down the lower edge of the segment to merely knife-edge thickness and leaving a relatively much greater thickness at the upper edge.

It will be appreciated that there is one difficulty involved in connection with the construction of lenses of this type in the higher power reading additions, this being due to the increase in thickness of the segment at the point 9 and the consequent necessity of allowing the lens as an entirety to be thicker to avoid any possibility of grinding through the rear surface. There has been discovered, however, that there is one manner of construction which will obviate this defect and at the same time provide a most satisfactory and desirable lens. This result is accomplished as indicated in Figures VIII and IX, by so forming the countersink 2 in the blank 1 that it does not cut over into the edge of the blank, the dividing line 4 stopping just short of such edge. The segment 3 is then fused in position in the usual manner producing a blank such as shown in Figure VIII. Taking this blank as a basis, the lens is then ground with its final prescription curve on the bifocal side with said curve swinging down through the segment 3, removing both the projecting or superfluous portion of said segment and also a portion of the combined fused segment and major blank toward the outer edge of the lens and a less amount at the central portion of the lens. The semi-finished blank thus produced will have a segment 24 presenting the appearance of a lentil or double convex lens in face view, in place of a circular or semi-circular portion, as has been the ordinary bifocal segment known in the past. This manner of grinding down through the lower portion of the lens, it will be seen, decrease the height 24 of the reading portion or segment and at the same time decreases its center point thickness, as will be best understood by a comparison of the length of the lines 25—26 and 27—28 in Figures VIII and IX, respectively, producing a quite thin lens even with a relatively high power addition and at the same time producing a lens having a wire field of vision for reading without the superfluous height which is not required for this purpose, and possessing the extra advantage that the finished lens may be cut out as indicated by the dotted lines in Figure X, so as to leave a small zone of the distance curve, as at 29, suitable for vision in going up and down stairs, or like purposes, where the average bifocal causes annoyance to the wearer.

What is claimed is:

1. A multifocal lens blank having a plurality of sections of glass placed edge to edge and provided with a continuous countersink over their adjacent edges, said countersink having a continuous basal curvature and angular shouldered side walls and a segment of glass of different index of refraction secured in the countersink.

2. A multifocal lens blank having a plurality of sections of glass placed edge to edge and provided with a continuous countersink overlying the adjacent edges of the sections, said countersink having a continuous basal curvature and angular shouldered side walls and a segment of glass of different refractive index fused in the countersink.

3. A multifocal lens blank having two major portions of glass in edge contacting relationship and having their geometrical axes parallel to one another, said major portions being provided at their contacting edges with a continuous countersink having a continuous basal curve and shouldered angular side walls, and a segment of different index of refraction disposed in the countersink and secured to both major portions of the blank.

4. The process of producing a multifocal lens blank consisting in mounting a plurality of major sections of glass on a block so that the geometrical centers will be parallel to one another, forming a continuous countersink overlying the adjacent edges of the major portions, and having shouldered angular side walls, forming a segment of glass of different index of refraction to substantially the same size and form as the countersink and securing the segment in the countersink.

5. The process of producing a multifocal lens blank consisting in mounting a plurality of major sections of glass on a block in substantially edge contacting relationship and with their geometrical centers parallel to one another, forming a continuous countersink with shouldered angular side walls overlying the contacting edges of the major sections, grinding a segment of glass of different index of refraction of the same form and size as the countersink, securing the segment in the countersink, separating the segment on a line between the edges of the major portions, and forming each major portion and its segment section to a continuous curve.

6. The process of producing a multifocal lens blank consisting in mounting a plurality of major sections of glass on a block in substantially edge contacting relationship and with their geometrical centers parallel to one another, forming a continuous countersink with shouldered angular side walls overlying the contacting edges of the major sections, forming a grinding segment of glass of different index of refraction of the same form and size as the countersink, securing the segment in the countersink, separating the segment on a line between the edges of the major portions, forming each major portion and its segment section to a continuous curve, and shaping the second side to a prescription curve.

7. A multifocal lens comprising a major portion for distance vision, and a minor portion for near vision inserted in the major portion, both portions being finished to one continuous curve the minor portion having a thin lower edge blended into the finished curve, and having a thick shouldered upper edge lying below the optical center of the major portion and above the optical center of the minor portion.

8. A multifocal lens comprising a major portion of glass of one index of refraction, and a minor portion of glass of a different index of refraction inserted in the major portion and both portions finished to one continuous curve, said minor portion tapering from a thick upper edge to a feather edge at its lowest point and the optical center of the minor portion being located near and below the thick edge at a point where a line drawn thru the center of curvature of the front and rear surfaces of the minor portion will, within the thickness of the minor portion be substantially coincident with a line drawn thru the centers of the inner surface of the minor portion and the inner surface of the major portion.

In testimony whereof I have affixed my signature.

EDGAR D. TILLYER.